United States Patent [19]

Lovelace

[11] Patent Number: 5,513,547
[45] Date of Patent: May 7, 1996

[54] COMBUSTION TURBINE ALIGNMENT METHOD AND APPARATUS

[75] Inventor: Alan R. Lovelace, Pensacola, Fla.

[73] Assignee: Westinghouse Electric Corporation, Pittsburgh, Pa.

[21] Appl. No.: 369,438

[22] Filed: Jan. 6, 1995

[51] Int. Cl.[6] ............................. B25B 11/00; B25B 27/14
[52] U.S. Cl. ................................................. 81/484; 29/271
[58] Field of Search ........................... 81/484, 464, 271,
81/888.01, 488; 29/888.011, 272; 285/24,
27; 269/43; 228/49.3

[56] References Cited

U.S. PATENT DOCUMENTS

| | | | |
|---|---|---|---|
| 1,435,887 | 11/1922 | Anderson | 29/271 |
| 4,052,045 | 10/1977 | Shaddix | 269/43 |
| 5,004,017 | 4/1991 | White | 29/464 |
| 5,228,181 | 7/1993 | Ingle | 269/43 |

Primary Examiner—Bruce M. Kisliuk
Assistant Examiner—Joni B. Danganan
Attorney, Agent, or Firm—M. G. Panian

[57] ABSTRACT

In a turbine system of the type wherein a first large cylinder having a first flange is connected to a second large cylinder having a second flange by a multiplicity of bolts securing the first flange to the second flange, a method of precisely aligning the first and second cylinders includes steps of (a) loosening the bolts that secure the first flange to the second flange so as to permit the first and second cylinders to be slightly shifted with respect to each other; (b) removing at least one of the bolts from its respective boltholes in the first and second flanges; (c) replacing the removed bolt in the respective boltholes with an apparatus for laterally shifting the first flange with respect to the second flange by a controlled amount; (d) shifting the flanges by using the apparatus; (e) tightening the bolts; (f) removing the apparatus; and (g) replacing and tightening the removed bolt. A unique apparatus for performing the lateral shifting is also disclosed.

4 Claims, 2 Drawing Sheets

COMBUSTION TURBINE ALIGNMENT METHOD AND APPARATUS

BACKGROUND OF THE INVENTION

1. Field of the Invention

This invention relates generally to the field of combustion turbines and the art of fabricating and assembling combustion turbine systems. More specifically, this invention relates to an improved method and apparatus for aligning adjacent cylinders in a combustion turbine that is far more efficient than conventional processes are.

2. Description of the Prior Art

Combustion turbines such as those manufactured by the owner of this invention, Westinghouse Electric Company, typically include several cylinders that need to be precisely aligned in order to insure that there is no rubbing during operation between the rotating and stationary components. In at least one common model of combustion turbine, the cylinders need to be aligned within approximately 0.015" from centerline to centerline.

Conventionally, the cylinders are aligned by loosening the vertical joint bolting that secures one cylinder to another, and using mechanical jacks between the floor and the respective cylinders or an adjacent unit to adjust the vertical and horizontal positions of each cylinder. The alignment is then checked by measuring the distances between selected locations on each cylinder and a wire that is stretched through the engine and centered to the bearing bores on each end.

Unfortunately, due to the weight and geometry of the cylinders it is very hard to determine the exact amount of movement that is obtained by jacking at one point on the cylinders. The cylinders do not stay round during the jacking process, so the bottom might move significantly more than the top during jacking. This creates a situation where alignment readings cannot be reliably repeated, and the alignment process must typically be performed between 4 and 7 times to obtain the necessary tolerances. As a result, the alignment process is expensive and time consuming; it can take several days.

It is clear that a long and unfilled need exists for an improved method and apparatus for centering the cylinders in a combustion turbine that is less time consuming and more efficient than convention techniques are.

SUMMARY OF THE INVENTION

Accordingly, it is an object of the invention to provide a more efficient and less time consuming method for aligning cylinders in a combustion turbine.

It is further an object of the invention to provide an improved apparatus for aligning cylinders during the fabrication of combustion turbines and the like systems. In order to achieve the above and other objects of the invention, an apparatus according to a first aspect of the invention for effecting a lateral adjustment between first and second objects that have substantially aligned first and second bore holes, respectively, defined therein includes a bushing member that is constructed and arranged to be received in the first bore hole of the first object, the bushing member having a space defined therein; a bar member having a first portion that is slidably received in the space that is defined in the bushing member and a second portion that is constructed and arranged to extend from the first portion into the second bore hole in the second object, the second portion having an inclined surface defined thereon that is inclined with respect to a central axis of the bar member; and a slide member having a slide surface and a bearing surface positioned thereon, the slide surface being in sliding engagement with the inclined surface on the bar member, the bearing surface being adapted for contact with the second object, whereby axial adjustment of the bar member will cause the bar member to cam the slide member against the second object, thereby laterally shifting the second object with respect to the first object.

According to a second aspect of the invention, in a turbine system of the type wherein a first large cylinder having a first flange is connected to a second large cylinder having a second flange by a multiplicity of bolts securing the first flange to the second flange, a method of precisely aligning the first and second cylinders includes steps of (a) loosening the bolts that secure the first flange to the second flange so as to permit the first and second cylinders to be slightly shifted with respect to each other; (b) removing at least one of the bolts from its respective bolt holes in the first and second flanges; (c) replacing the removed bolt in the respective bolt holes with an apparatus for laterally shifting the first flange with respect to the second flange by a controlled amount; (d) shifting the flanges by using the apparatus; (e) tightening the bolts; (f) removing the apparatus; and (g) replacing and tightening the removed bolt.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
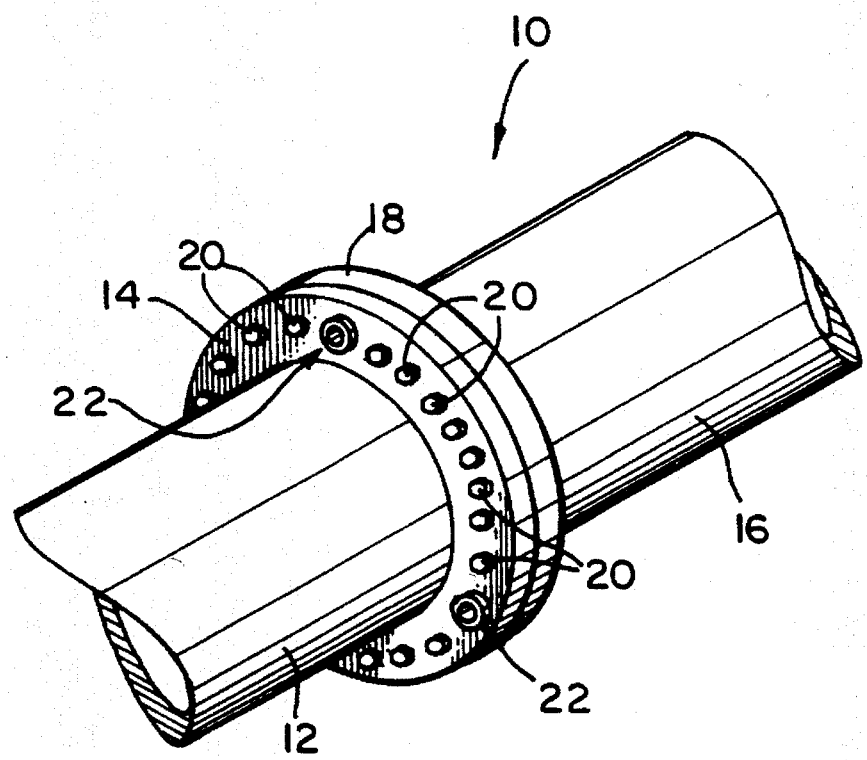
FIG. 1 is a perspective view depicting a method and apparatus that is constructed according to a preferred embodiment of the invention.

Referring now to the drawings, wherein like reference numerals designate corresponding structure throughout the views, and referring in particular to FIG. 1, a combustion turbine system 10 that is in the process of being constructed includes a number of cylinders that must be precisely aligned, including a first large cylinder 12 having a first flange 14 and a second large cylinder 16 having a second flange 18. As shown in FIG. 1, flanges 14, 18 are secured together by a multiplicity of bolts 20 that are of conventional design.

FIG. 1 also depicts the presence of two apparatuses 22 that are constructed according to a preferred embodiment of the invention for effecting a lateral adjustment between the first and second flanges 14, 18, and thus, between the first and second cylinders 12, 16. Two of the bolts 20 have been removed to permit insertion of the two apparatuses 22, in a method that will be described in greater detail below.

Figure 3:
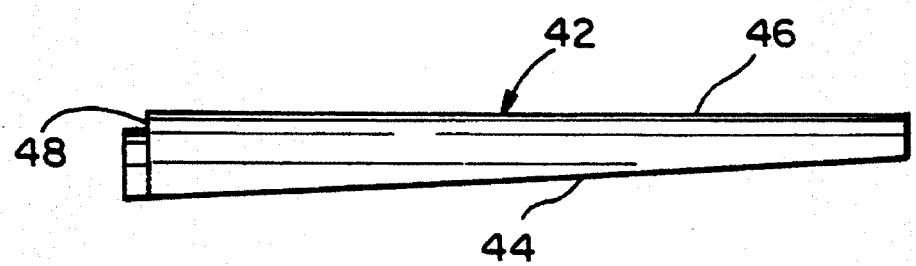
FIG. 3 is an isolation view of one component of the system that is depicted in FIGS. 1 and 2.
Figure 2:
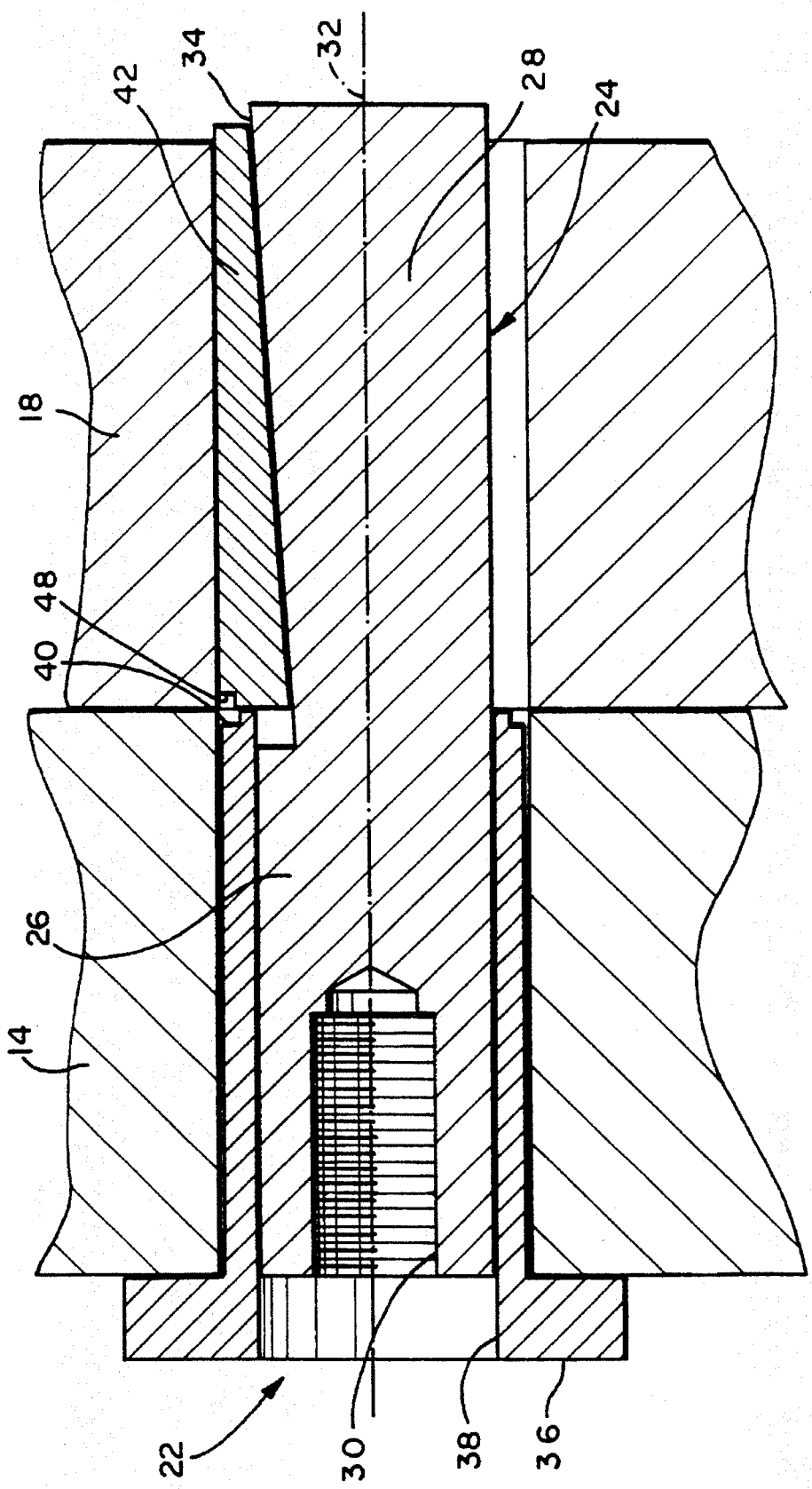
FIG. 2 is a fragmentary cross-sectional view through one component of the system that is depicted in FIG. 1.

Referring now to FIGS. 2 and 3, it will be seen that the apparatus 22 for effecting a lateral adjustment between the first and second object 14, 18 includes an elongated bar member 24 that has a first portion 26 and a second portion 28.

The first portion 26 of bar member 24 has a threaded bore 30 defined therein, so that a tool such as a hydraulic jack may be connected to the bar member 24 to adjust the axial position of bar member 24 with respect to the bore holes that are defined in the first and second flanges 14, 18. A central axis 32 of apparatus 22 is depicted in FIG. 2.

As may further be seen in FIG. 2, first portion 26 of bar member 24 has a length that is substantially equal to the thickness of first flange 14, and second portion 28 that has a length that is approximately equal to the thickness of second flange 18. Second portion 28 has an inclined surface 34 defined thereon that is inclined with respect to the central axis 32 of bar member 24. As may be seen in FIG. 2, a bushing member 36 is provided which is constructed and arranged to fit snugly within the bore hole that is defined in the first flange 14, and has a space defined therein by an inner wall 38 for slidably receiving the first portion 26 of bar member 24. Bushing member 36 includes a cut-out portion 40 at a distal end thereof that is closest to second flange 18, so that contact between second flange 18 and bushing member 36 is avoided during operation.

Looking now to FIGS. 2 and 3, it will be seen that apparatus 22 further includes a slide member 42 that has a slide surface 44 and a bearing surface 46 positioned thereon. Slide surface 44 is in sliding engagement with the inclined surface 34 on the second portion 28 of bar member 24, and bearing surface 46 is in contact with the borehole wall of second flange 18, as is best shown in FIG. 2. Accordingly, when bar member 24 is moved axially to the left as shown in FIG. 2, the relative motion between inclined surface 34 and slide surface 44 will cam slide member 42 upwardly, thus forcing bearing surface 46 against second flange 18 and laterally shifting second flange 18, and thus second cylinder 16, upwardly with respect to first flange 14 and first cylinder 12, respectively. Slide member 42 has a cut-out portion 48 on an end thereof that is closest to first flange 14 to prevent contact between slide member 42 and first flange 14 during operation.

Typically, each flange 14, 18 will have a multiplicity of bolt holes. In one common model, each flange has upward of 120 bolt holes.

In operation, at least one, and possibly several bolts 20 are removed from the respective flanges 14, 18, and are replaced by an apparatus 22 as is illustrated in FIG. 1. The apparatuses 22 are each oriented so as to urged the respective flanges 14, 18 in a desired direction when actuated. The bolts 20 that have not been removed are then slightly loosened in order to permit relative movement between the flanges 14, 18. A tool, which is preferably a hydraulic jack, is then inserted into the threaded bores 30 of the respective apparatuses 22, and is used to actually shift bar member 24 to cam slide member 42 in a direction in which a lateral shift between the respective flanders 14, 18 is desired. This can be performed sequentially, or simultaneously by using several hydraulic jacks at once. One apparatus 22, for example, may be oriented so as to provide a vertical shift between the flanges 14, 18, while a second apparatus 22 may be oriented so as to accomplish a horizontal adjustment.

Once the desired alignment has been achieved, the bolts that have not been removed are then tightened, thereby securing the flanges 14, 18 in the aligned position. The apparatuses 22 are then removed, and are replaced by the original bolts, which are tightened to complete the alignment process.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An apparatus for effecting a lateral adjustment between first and second objects that have substantially aligned first and second boreholes, respectively, defined therein, comprising:

a bushing member that is constructed and arranged to be received in the first borehole of the first object, said bushing member having a space defined therein;

a bar member having a first portion that is slidably received in said space that is defined in said bushing member and a second portion that is constructed and arranged to extend from said first portion into the second borehole in the second object, said second portion having an inclined surface defined thereon that is inclined with respect to a central axis of said bar member; and a slide member having a slide surface and a bearing surface positioned thereon, said slide surface being in sliding engagement with said inclined surface on said bar member, said bearing surface being adapted for contact with the second object, whereby axial adjustment of said bar member will cause said bar member to cam said slide member against the second object, thereby laterally shifting the second object with respect to the first object.

2. An apparatus according to claim 1, wherein said bushing member has a cutout portion in a distal end thereof, whereby contact with the second object is avoided.

3. An apparatus according to claim 1, wherein said first portion of said bar member has a threaded bore defined therein, whereby a tool may be connected to said bar member to effect axial adjustment of said bar member with respect to said bushing.

4. An apparatus according to claim 1, wherein said slide surface of said slide member is inclined with respect to said bearing surface of said slide member.

* * * * *